Sept. 1, 1964 J. W. WETZEL 3,146,877
COLD BAR COLLECTING, WEIGHING, AND CONVEYING MECHANISM
Filed June 6, 1962 7 Sheets-Sheet 4
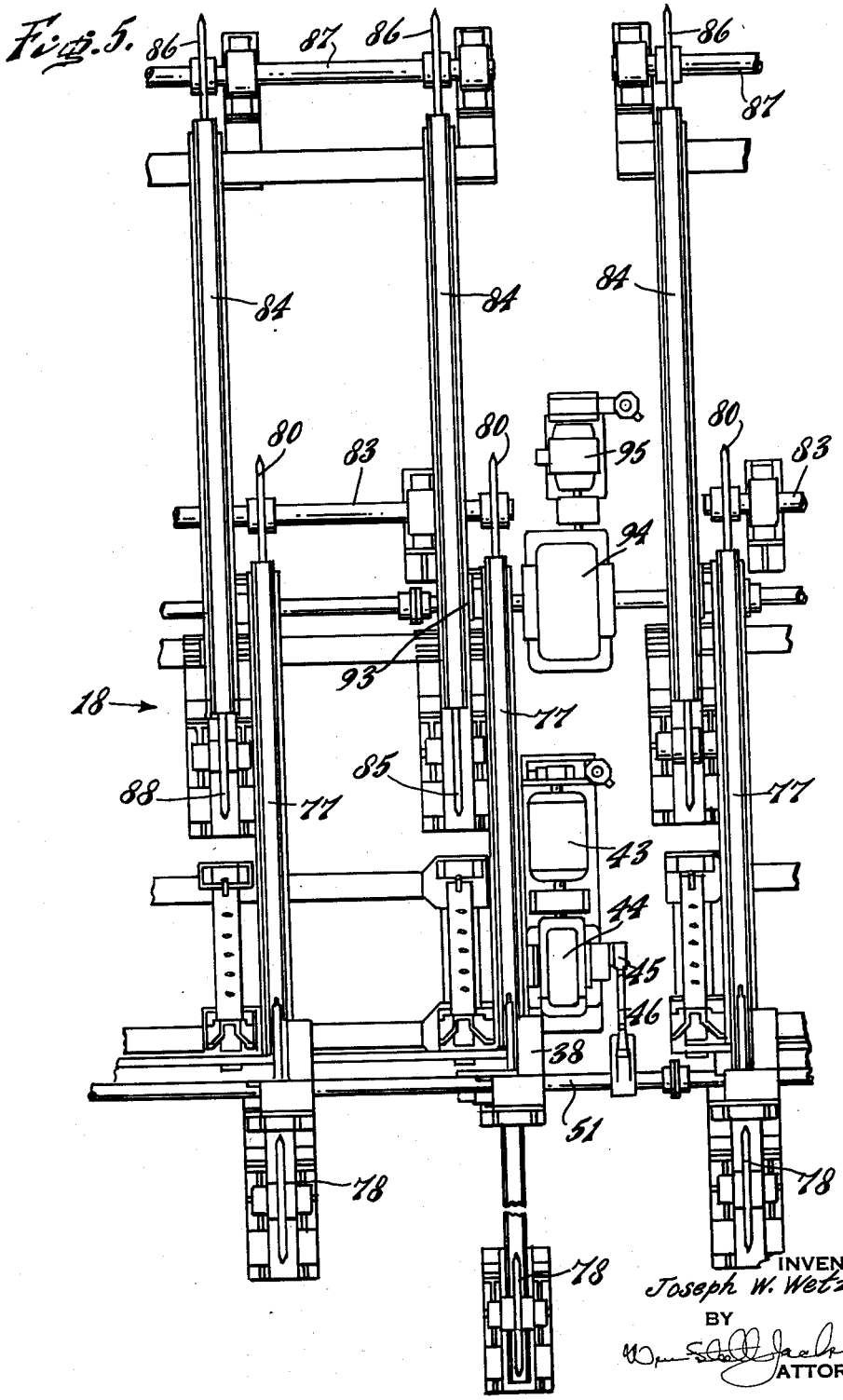
INVENTOR
Joseph W. Wetzel
BY
ATTORNEY Sept. 1, 1964 J. W. WETZEL 3,146,877
COLD BAR COLLECTING, WEIGHING, AND CONVEYING MECHANISM
Filed June 6, 1962 7 Sheets-Sheet 5
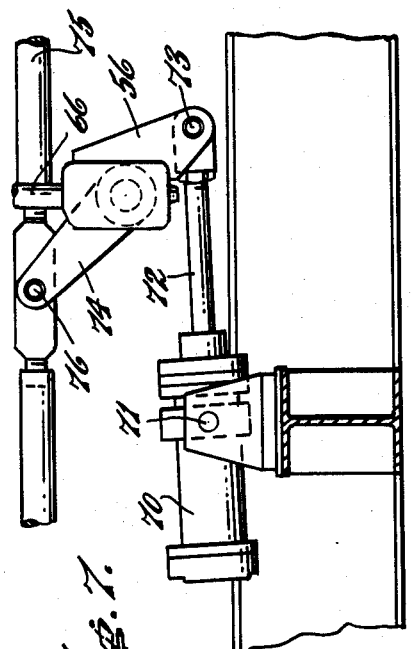
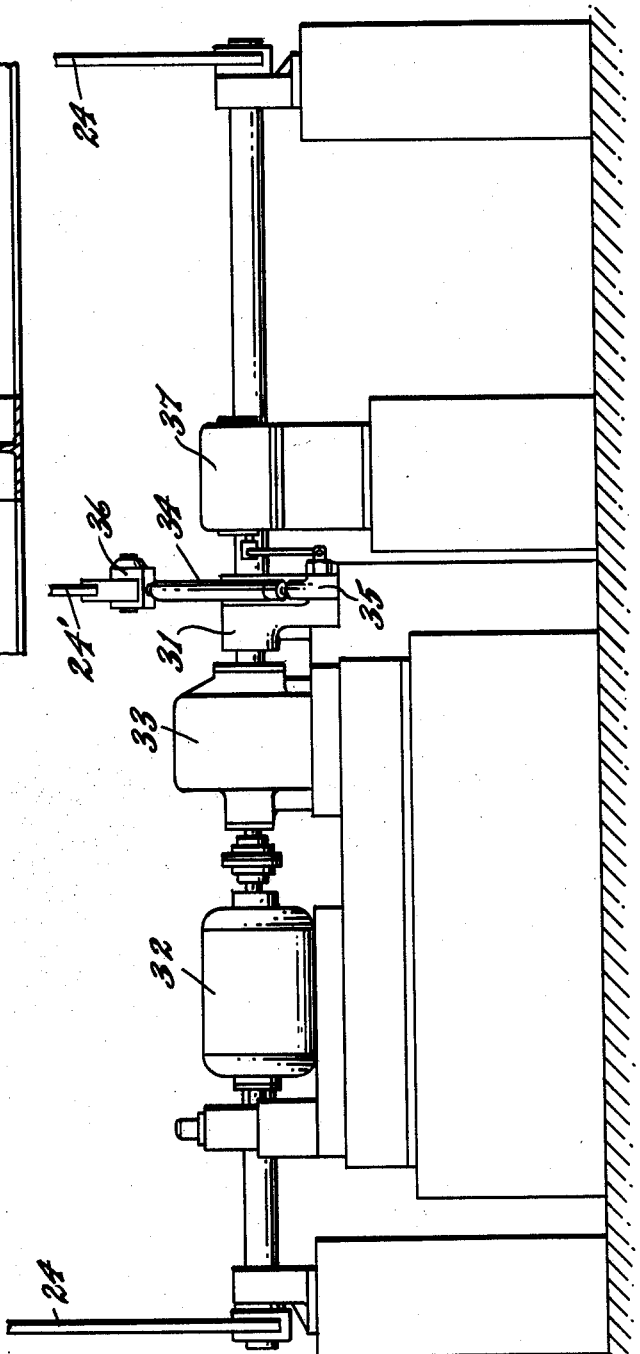
INVENTOR
Joseph W. Wetzel
BY
ATTORNEYS

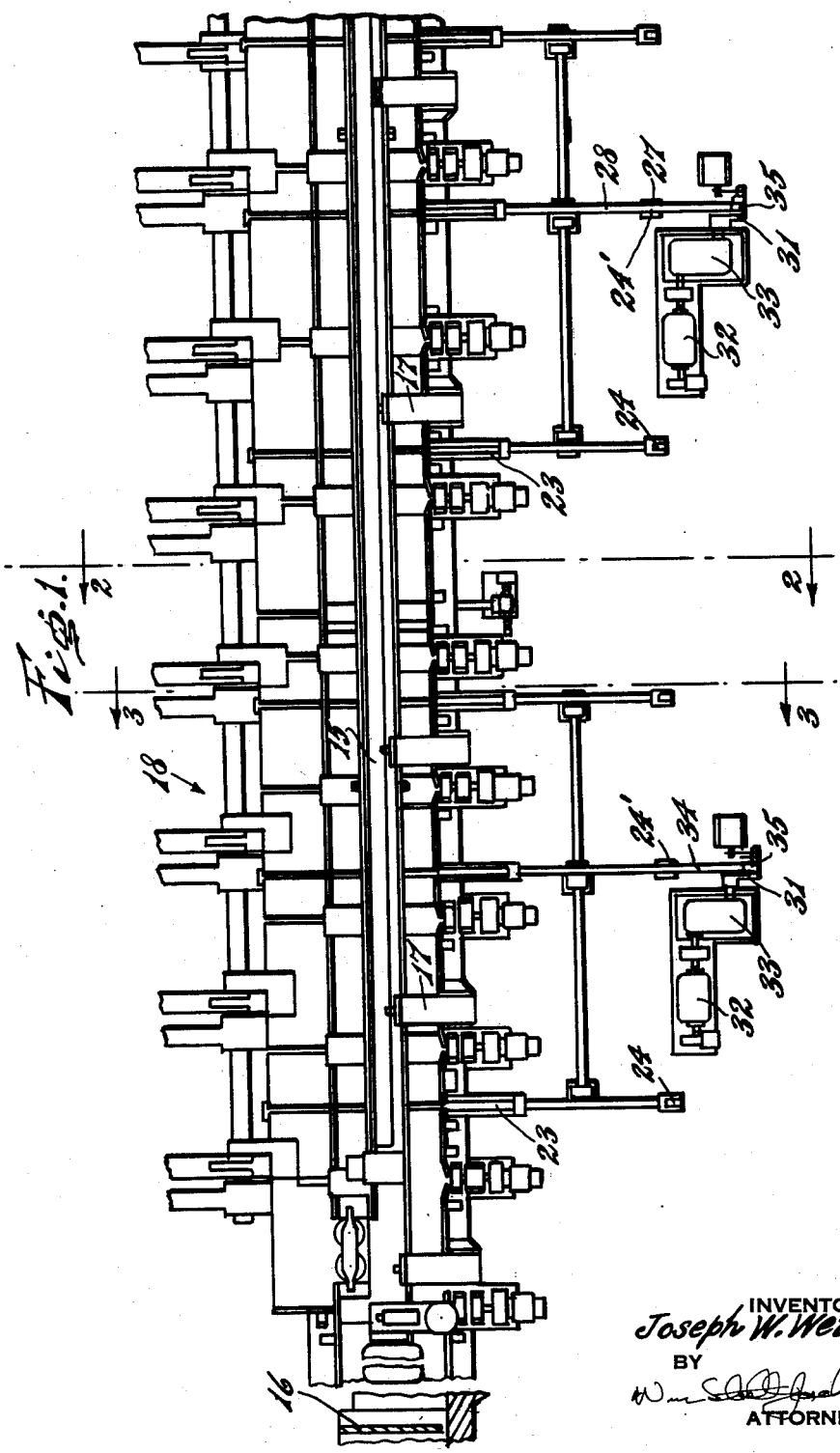

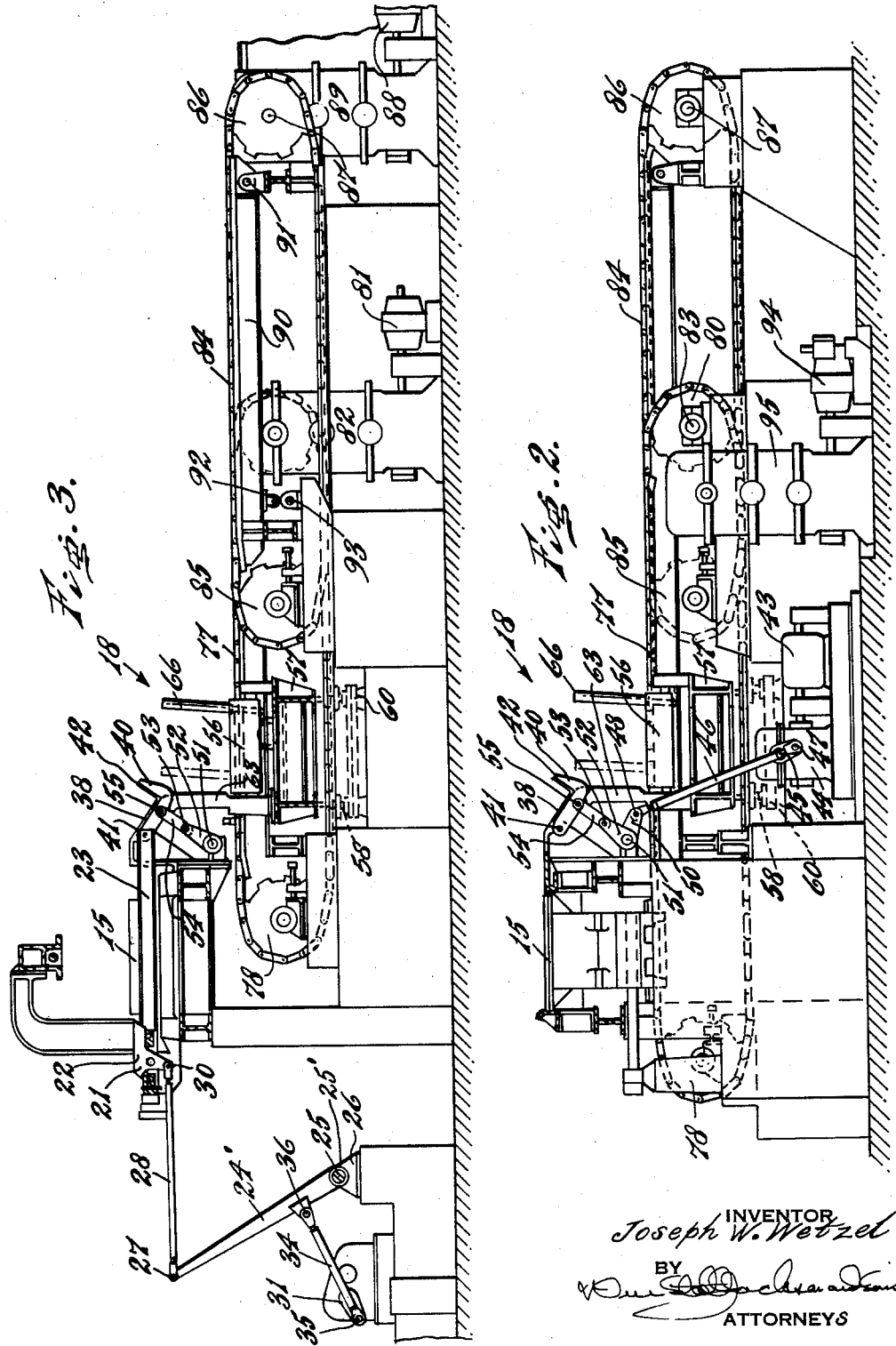

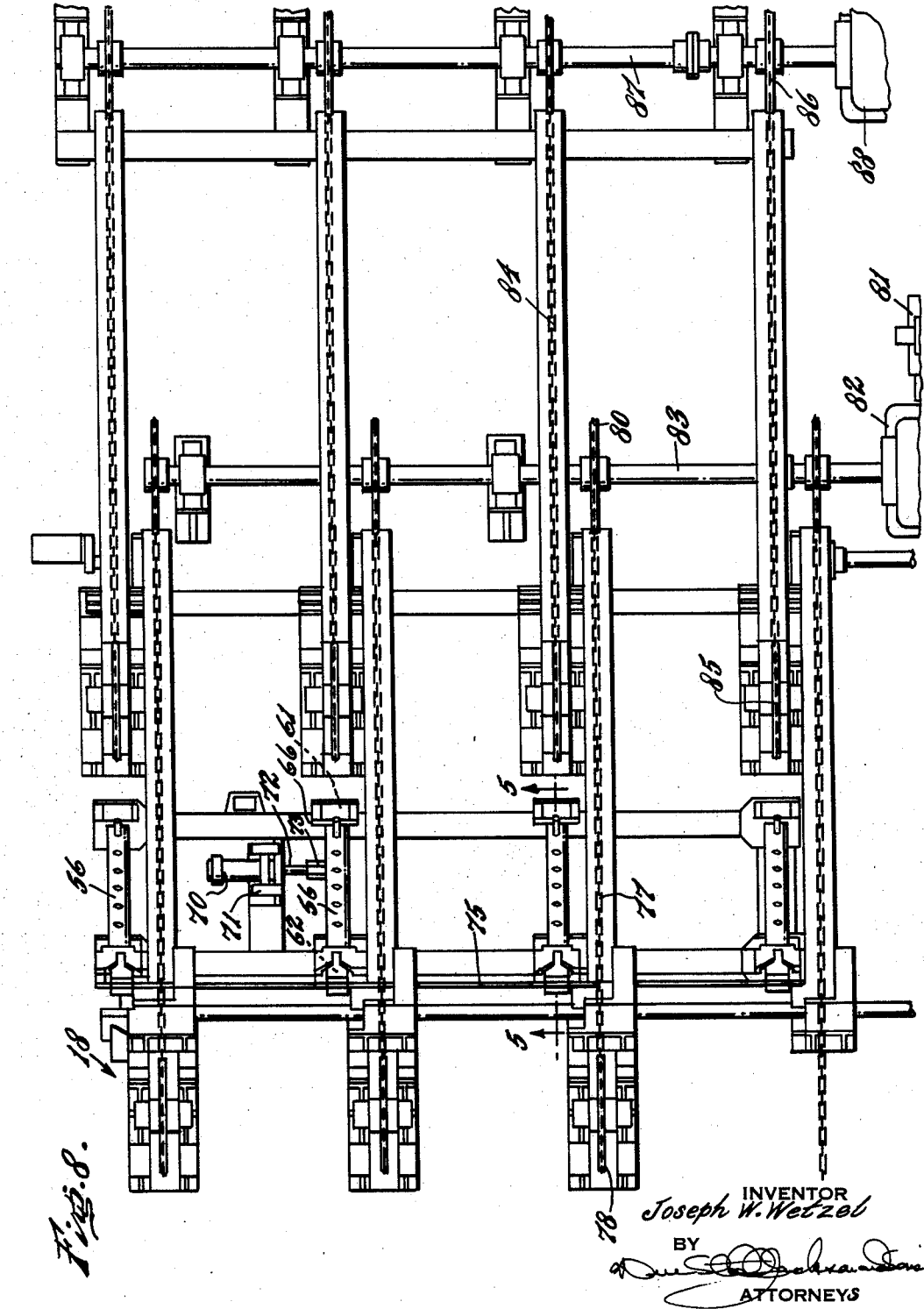

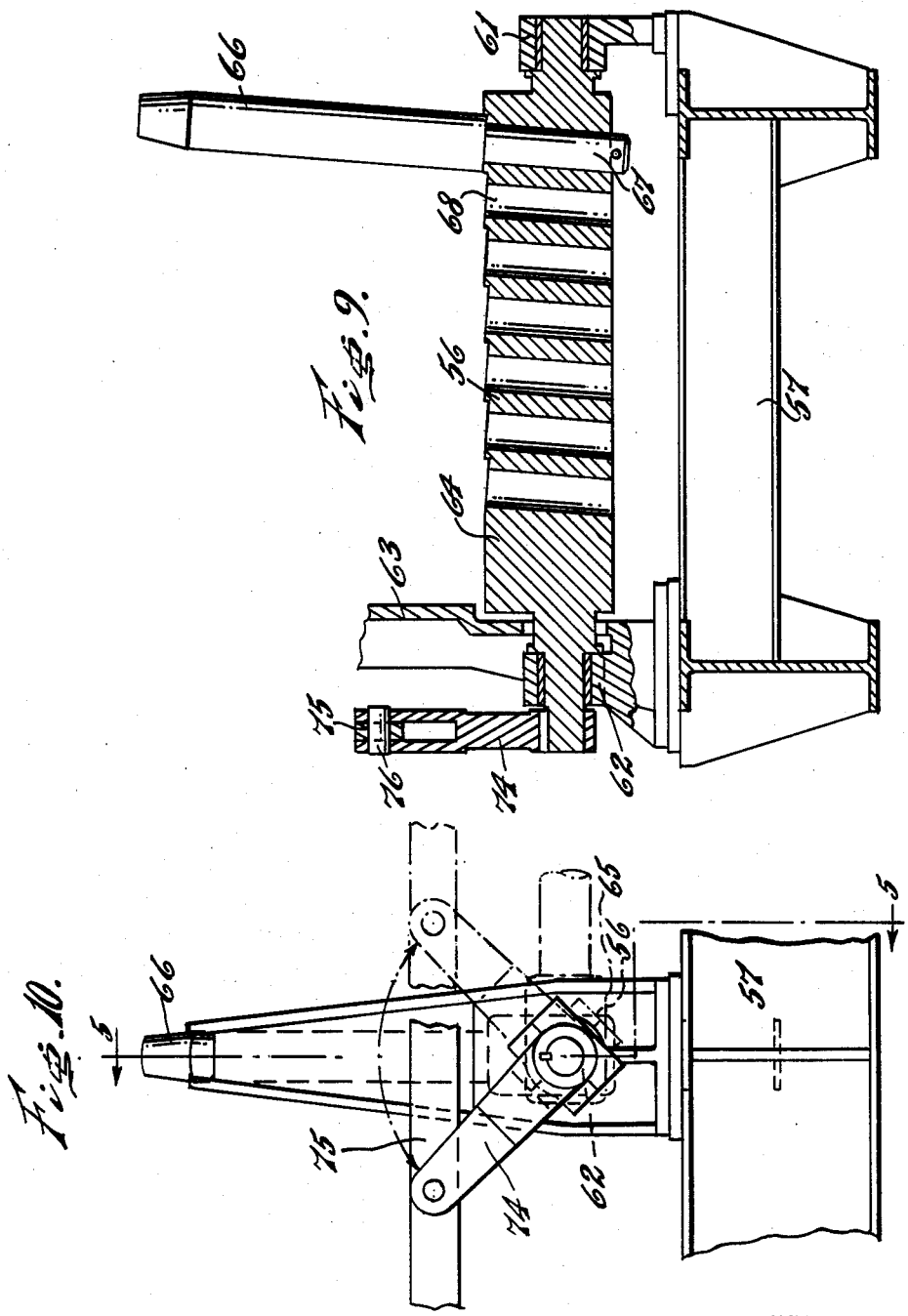

United States Patent Office 3,146,877
Patented Sept. 1, 1964

3,146,877
COLD BAR COLLECTING, WEIGHING, AND
CONVEYING MECHANISM
Joseph W. Wetzel, Pottstown, Pa., assignor to Birdsboro
Corporation, Birdsboro, Pa., a corporation of
Pennsylvania
Filed June 6, 1962, Ser. No. 200,530
3 Claims. (Cl. 198—39)

The present invention relates to bundle assembling and conveying mechanism, particularly useful as an adjunct to a rolling mill.

A purpose of the invention is to permit assembling of bundles of bars or the like and weighing the same, and then discharging the bars onto a conveyor.

A further purpose is to permit ready removal of cradle stops and lowering of bundles of bars onto a conveyor for transfer.

A further purpose is to facilitate weighing of the groups of bundles of bars ordered by a customer.

Further purposes appear in the specification and in the claims.

In the drawings I have chosen to illustrate one only of the numerous embodiments in which the invention may appear, selecting the form shown from the standpoints of convenience in illustration, satisfactory operation and clear demonstration of the principles involved.

FIGURE 1 is a plan view showing a shear cutting table and shear connected to a shear gauge table and cold bar collecting stations according to the present invention.

FIGURE 2 is an enlarged fragmentary vertical section taken on the line 2—2 of FIGURE 1 and showing the shear gauge table and cold bar collecting unit in elevation.

FIGURE 3 is an enlarged vertical section on the line 3—3 of FIGURE 1.

FIGURES 4 and 5 show respectively the left and right hand portions in plan of a cold bar collecting and transfer unit of the invention.

FIGURE 6 is a left end elevation of the device of FIGURE 1 to enlarged scale partially broken away.

FIGURE 7 is a fragmentary enlargement of the mechanism for operating the cradle of the invention.

FIGURE 8 is a plan view of the cold bar collecting cradle and bundle transfer of the invention to somewhat reduced scale, showing an intermediate portion at which FIGURES 4 and 5 join.

FIGURE 9 is an enlarged fragmentary section of FIGURE 8 taken on the line 5—5.

FIGURE 10 is an end elevation of the cradle of FIGURE 5 showing the bearing system and the interconnecting crank and link mechanism.

Figure 4:
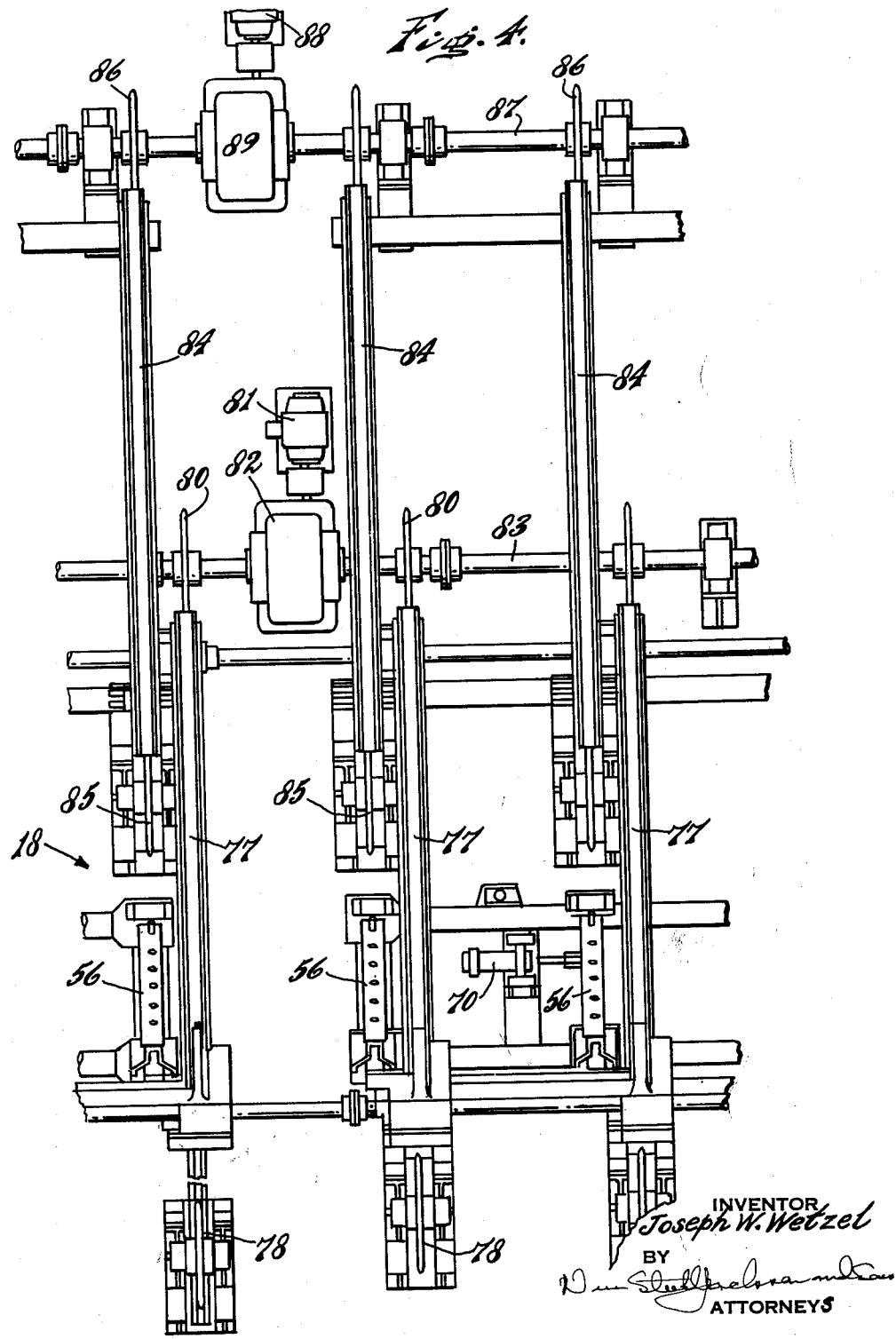

Describing in illustration but not in limitation and referring to the drawings:

It is very desirable to be able to assemble work bars from a rolling mill in a form which will correspond to the requirements of a customer's order, or a certain portion of the customer's order, while at the same time desirably permitting weighing of the particular increment of material, and distribution as desired when weighing has been completed.

In accordance with the present invention work bars or bundles of work bars are assembled on cradles, and desirably weighed in this position. The cradles are then rocked about the longitudinal axis thereof, in such a manner as to cause the stops or pins to move into a nonobstructing position, desirably at the same time lowering the work bars on conveyor means so that the bars can be progressed to a point of discharge.

Considering now the drawings in detail, the work bars, suitably after leaving the rolling mill and passing over a cooling bed, as well known in the art, pass through a shear and onto a table 15 which in the form shown is suitably a shear gauge table, provided with a shear 16 and with gauging structure 17 which forms no part of the present invention and is illustrated merely for the sake of completeness.

Work bars cut by the shear to the required length and intercepted at any suitable point by the gauge means 17 on gauging table 15 are discharged laterally from the gauging table onto bundle assembly area 18 by kick-off 21 of any suitable character but in the form shown consisting of kick-off dogs 22 slidable laterally on guides 23 under the action of crank mechanism operating on levers 24 and 24' keyed near the bottom to shafts 25, which are journaled at 25' on stands 26 and pivotally connected at 27 at the top with connecting rod 28 which at the opposite end is pivotally connected at 30 with the kick-off dog 22.

The levers 24' are operated from cranks 31 driven by motors 32 and speed reducers 33 and connected to the levers by connecting rods 34 pivotally connected at 35 to the cranks and pivotally connected at 36 to the levers 24. Limiting motion is determined by a limit switch control 37 operated by the crank as well known.

Work bars which are discharged from the gauging table 15 by the kick-off are conveniently assembled into groups or packs into pockets 38 which incline downwardly and have latching levers 40 pivoted near the upper ends at 41, provided with stop abutments 42 at the lower ends, and depressed to release the contents of the pocket by means of a motor 43 (FIGURES 2 and 5) connected to a speed reducer 44 which turns a crank 45 driving the connecting rod 46 which is pivotally connected to the crank at 47 and pivotally connected at the opposite end at 48 to a lever 50 on a cross shaft 51 on suitable bearings. The cross shaft 51 at intervals has levers 52 mounted thereon which pivotally connect at 53 to links 54, the opposite ends of which pivotally connect at 55 with the lower ends of pocket latching levers 40.

The pockets 38 can be used to assemble a group of bars and also to permit the workmen to apply bands to form a pack.

Beneath the pockets and forwardly disposed with respect thereto are a series of horizontally mounted cradles 56 best seen in FIGURES 2, 3, 4, 5, 8, 9, and 10. The cradles are disposed longitudinally with respect to the direction of progression of the bars as they move transversely to their lengths, and are supported on a weighing frame 57 which is mounted on load cells 58 from an under frame 60 best seen in FIGURES 2 and 3. The support of the cradles on the weighing frame is accomplished by bearings 61 and 62 at the opposite ends, the bearings at the rearward end being extended upwardly to form rear stops 63.

The cradles are preferably of rectangular cross section and when upright they have a relatively high vertical portion 64 while when viewed sideways as shown in FIGURE 10, they are relatively narrower in horizontal section at 65 when the cradles are upright.

At the forward end of the cradles in the direction of progression are mounted forward stops or pins 66 which are adjustable in position and have lower reduced shank portions 67 which are received in any one of a plurality of openings 68 which extend generally vertically downwardly through the cradles when the cradles are upright, but are desirably slightly inclined, as best seen in FIGURE 9, so that the tops of the stops are positioned forward of the bottoms, thus permitting the stops to swing out of the way without binding on the assemblage of bars or of bar packs. This clearance feature is very desirable.

The cradles can be rocked or turned by suitable means here shown as a fluid actuated cylinder 70, FIGURES 7 and 8, pivoted on trunnions 71 and having a piston and rod 72 which pivotally connects at 73 to the bottom of one of the cradles 56. Each cradle has keyed thereon a lever 74 (FIGURES 7, 9 and 10) and the levers interconnect from one cradle to the next by pull rods 75 pivoted to the tops of the levers at 76.

The structure is desirably made in sections, FIGURES 4 and 5 illustrating slightly more than one section, and the sections being repeated as required along the length so that when one cradle of a section rocks or turns, all of the cradles of that section rock or turn.

When the cradles rock, they lower the work bars because the cross section of the cradle sideways at 65 is less than the cross section vertically at 64 and also when they rock 90° from the full line position of FIGURES 9 and 10, the stops or pins 66 are moved out of the way of the work bars.

The effect is to deposit the work bars or groups or packs of work bars on conveyor means consisting of conveyor chains 77, best seen in FIGURES 2, 3, 4, 5 and 8, which are mounted on sprockets 78 and 80, the sprockets 80 being driven by a motor 81 and speed reducer 82. The speed reducer interconnects with the sprockets 80 by a shaft 83.

In order to provide for flexibility of operation it is desirable to use a succession of conveyors and the chains 77 are shown discharging to chains 84 which are supported on sprockets 85 at the rear and sprockets 86 at the front, the sprockets 86 being supported on shaft 87 driven by motor 88 and speed reducer 89. As best seen in FIGURES 2 and 3, a track 90 extends beneath the upper stretch of the chain 84 and is pivoted at one end 91 and at the other end carries a roller 92 which rides an eccentric 93 driven by a motor 94 and a speed reducer 95. When the eccentric actuates the apron 90 to raise the chain 84 the work is picked up by the chain 84 and lifted off the earlier chain 77. Any suitable conveyor means may be used below the level of the cradles.

The sprockets suitably advance the work bars or packs of work bars until they are picked up by a crane or similar mechanism.

In operation, the work bars of steel or any suitable metal, from the rolling mill pass across the cooling bed and through the shear 16 and the shear gauging table 15. They then are discharged into pockets 38 and are assembled and suitably banded into packs. By means of the cranks 45 the pockets are emptied to deposit the work bars or packs of work bars on the cradles while the cradles are upright and the stops or pins 66 are properly adjusted to provide the width of space on the cradles which are required.

If desired, the work bars can be discharged directly in the cradles without remaining on the pockets by simply depressing the latching levers 40 and maintaining them depressed.

After a suitable load on the cradles has been built up and the weighing operation has been completed by observing the load on the load cells 58, the fluid cylinders 70 are energized so as to rotate the cradles 90°, in which case the work bars rest on the chain conveyor 77 because of the fact that the cradles have a thin section now upright, so that the work is lowered onto the conveyor 77. With the stops or pins 66 out of the way, the work bars are progressed across the conveyors and suitably picked up by the crane or other pickup means in a manner well known in the art.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In transfer mechanism, a plurality of aligned cradles extending parallel to one another and adapted to receive a collection of objects to be transferred, said cradles having an operative position and an inoperative position in which the cradles are rotated 90 degrees with respect to the operative position, bearings pivoting the cradles on longitudinal axes of the cradles which are parallel to one another, said cradles when in the operative position having a relatively great vertical dimension and an active surface at the top which supports the objects, said cradles in the inoperative position having a lesser vertical dimension and having no work-supporting surface, forward stops mounted on the cradles at forward position and in one position of each cradle extending upwardly, rearward stops adjoining the cradles, conveyor means extending longitudinally of the cradles at a position beneath the work-supporting surface of the cradles when the cradles are in operative position, said conveyor means being above the cradles when the cradles are in inoperative position, and means for rotating the cradles in unison about their longitudinal axes until their forward stops are below the level of the conveyor means and until objects on the work-supporting surfaces of the cradles are lowered to rest on the conveyor means.

2. A mechanism of claim 1, in which the cradles have a number of stop-receiving openings, the forward stops being adjustable to selected openings along the cradles.

3. A mechanism of claim 1, in combination with weighing means supporting the cradle bearings.

References Cited in the file of this patent

UNITED STATES PATENTS

| | | |
|---|---|---|
| 1,416,211 | Jupp et al. | May 16, 1922 |
| 2,603,338 | Fried | July 15, 1952 |
| 2,607,467 | Morgan | Aug. 19, 1952 |
| 2,886,929 | Villemont | May 19, 1959 |